United States Patent
Koskinen

(10) Patent No.: US 9,930,694 B2
(45) Date of Patent: Mar. 27, 2018

(54) RE-TRANSMITTING A POLL TO A PEER PROTOCOL ENTITY WHEN A TIMER EXPIRES

(71) Applicant: NOKIA TECHNOLOGIES OY, Espoo (FI)

(72) Inventor: Henri Markus Koskinen, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 75 days.

(21) Appl. No.: 15/088,546

(22) Filed: Apr. 1, 2016

(65) Prior Publication Data

US 2017/0290055 A1    Oct. 5, 2017

(51) Int. Cl.
| | |
|---|---|
| *H04W 74/06* | (2009.01) |
| *H04L 29/08* | (2006.01) |
| *H04L 1/08* | (2006.01) |
| *H04L 12/26* | (2006.01) |
| *H04L 1/18* | (2006.01) |

(52) U.S. Cl.
CPC .............. *H04W 74/06* (2013.01); *H04L 1/08* (2013.01); *H04L 1/1864* (2013.01); *H04L 43/0858* (2013.01); *H04L 43/103* (2013.01); *H04L 69/324* (2013.01)

(58) Field of Classification Search
CPC ........ H04W 74/06; H04L 69/324; H04L 1/08; H04L 43/0858; H04L 1/1864; H04L 43/103
See application file for complete search history.

(56) References Cited

U.S. PATENT DOCUMENTS

| | | |
|---|---|---|
| 2004/0208160 A1 | 10/2004 | Petrovic et al. |
| 2013/0194933 A1 | 8/2013 | Celik et al. |
| 2014/0112221 A1 | 4/2014 | Verger et al. |

FOREIGN PATENT DOCUMENTS

| | | |
|---|---|---|
| WO | 2009/076124 | 6/2009 |
| WO | 2014/204367 A1 | 6/2017 |

OTHER PUBLICATIONS

International Search Report and Written Opinion application No. PCT/FI2017/050143 dated Jun. 2, 2017.

*Primary Examiner* — Omar J Ghowrwal

(74) *Attorney, Agent, or Firm* — Squire Patton Boggs (US) LLP

(57) ABSTRACT

Systems, methods, apparatuses, and computer program products for expediting repetition of an unanswered poll for automatic repeat request (ARQ) feedback are provided. One method includes transmitting a poll to a peer protocol entity to trigger status reporting at the peer protocol entity, starting a timer with a duration that is set based on whether at least one predefined condition is met. The at least one predefined condition depends at least on a value of a sequence number (SN) of a protocol data unit (PDU) in which the poll is transmitted. The method may further include re-transmitting a poll when the timer expires.

17 Claims, 3 Drawing Sheets

RE-TRANSMITTING A POLL TO A PEER PROTOCOL ENTITY WHEN A TIMER EXPIRES

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-Advanced Pro, LTE-M, and/or 5G radio access technology. In particular, some embodiments may relate to latency reduction in LTE, and/or relate to the LTE radio link control (RLC) protocol in acknowledged mode (AM) or the 5G counterpart of RLC.

Description of the Related Art

Universal Mobile Telecommunications System (UMTS) Terrestrial Radio Access Network (UTRAN) refers to a communications network including base stations or Node Bs, and, for example, radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency.

SUMMARY

One embodiment is directed to a method, which may include transmitting, for example by a protocol entity, a poll to a peer protocol entity to trigger status reporting at the peer protocol entity. The method may further include starting a timer with a duration that is based on whether at least one predefined condition is met. The at least one predefined condition may depend at least on a value of a sequence number (SN) of a protocol data unit (PDU) in which the poll is transmitted. The method may further include re-transmitting another poll when the timer expires.

Another embodiment is directed to an apparatus including at least one processor and at least one memory including computer program code. The at least one memory and computer program code are configured, with the at least one processor, to cause the apparatus at least to transmit a poll to a peer protocol entity to trigger status reporting at the peer protocol entity, start a timer with a duration that is based on whether at least one predefined condition is met. The at least one predefined condition may depend at least on a value of a sequence number (SN) of a protocol data unit (PDU) in which the poll is transmitted. The at least one memory and computer program code may be further configured, with the at least one processor, to cause the apparatus at least to re-transmit another poll when the timer expires.

Another embodiment is directed to a computer program, embodied on a non-transitory computer readable medium. The computer program is configured to control a processor to perform a process, which may include transmitting a poll to a peer protocol entity to trigger status reporting at the peer protocol entity. The process may further include starting a timer with a duration based on whether at least one predefined condition is met. The at least one predefined condition may depend at least on a value of a sequence number (SN) of a protocol data unit (PDU) in which the poll is transmitted. The process may further include re-transmitting another poll when the timer expires.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for expediting repetition of an unanswered poll for automatic repeat request (ARQ) feedback, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to latency reduction in LTE and the LTE RLC protocol in acknowledged mode (AM). Certain embodiments may also have use in the 5G counterpart of RLC. More specifically, an embodiment of the invention addresses the duration of the RLC's poll-retransmit timer.

RLC protocol may reside in the stack between packet data convergence protocol (PDCP) and medium access control (MAC) and can be controlled by radio resource control (RRC). RLC may operate in three different modes: RLC Acknowledged Mode (AM), RLC Transparent Mode (TM), and RLC unacknowledged mode (UM). RLC AM functions may include: error correction through ARQ feedback, re-segmentation of RLC PDUs, in-sequence delivery or transfer of upper-layer PDUs, concatenation, segmentation, reassembly or discard of RLC service data units (SDUs), duplicate detection, RLC re-establishment, and/or protocol error detection.

Figure 1:
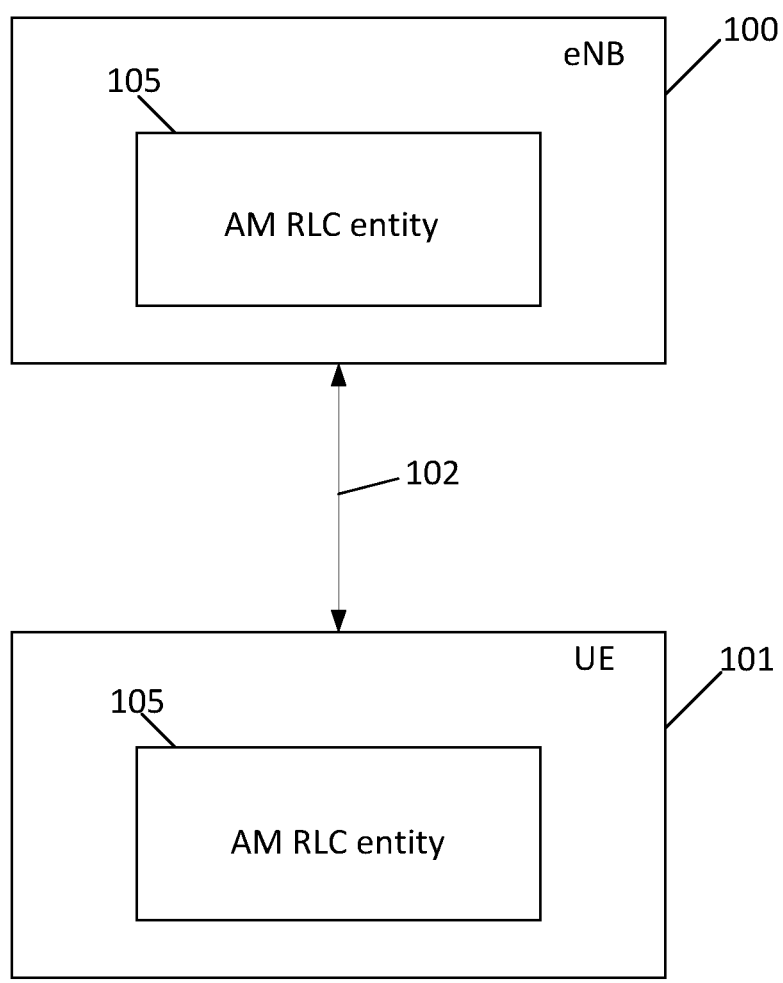
FIG. 1 illustrates an example system, according to one embodiment of the invention.

FIG. 1 illustrates an example block diagram of a system in which embodiments of the invention may be applicable. As illustrated in FIG. 1, the system may include an eNB 100 and a UE 101. eNB 100 may be a hardware node in a LTE network or in a 5G network, for example. UE 101 may be in communication with or served by eNB 100 via a link or interface 102. Moreover, each of eNB 100 and UE 101 may include one or more AM RLC entities 105, for example. The functionality of AM RLC entities will be discussed in detail below.

3GPP TS 36.322 includes a RLC-procedure description (section 5.2) which provides that an AM RLC entity can poll its peer AM RLC entity in order to trigger STATUS reporting at the peer AM RLC entity. As discussed in 3GPP TS 36.322 section 5.2.2.1 entitled "Transmission of a AMD PDU or AMD PDU segment", upon assembly of an acknowledged mode data (AMD) protocol data unit (PDU) or AMD PDU segment, the transmitting side of an AM RLC entity shall: if both the transmission buffer and the retransmission buffer becomes empty (excluding transmitted RLC data PDU awaiting for acknowledgements) after the transmission of the RLC data PDU or if no new RLC data PDU can be transmitted after the transmission of the RLC data PDU (e.g. due to window stalling), include a poll in the RLC data PDU. After delivering a RLC data PDU including a poll to lower layer and after incrementing of VT(S) if necessary, the transmitting side of an AM RLC entity shall: set POLL_SN to VT(S)−1; if t-PollRetransmit is not running then start t-PollRetransmit, or else restart t-PollRetransmit. It is noted that t-PollRetransmit is a poll retransmit timer. It is also noted that VT(S) is a send state variable, which will be discussed in detail below.

As discussed in 3GPP TS 36.322 section 5.2.2.2 entitled "Reception of a STATUS report", upon reception of a STATUS report from the receiving RLC AM entity the transmitting side of an AM RLC entity shall: if the STATUS report comprises a positive or negative acknowledgement for the RLC data PDU with sequence number equal to POLL_SN and if t-PollRetransmit is running, then stop and reset t-PollRetransmit.

As discussed in 3GPP TS 36.322 section 5.2.2.3 entitled "Expiry of t-PollRetransmit", upon expiry of t-PollRetransmit, the transmitting side of an AM RLC entity shall: if both the transmission buffer and the retransmission buffer are empty (excluding transmitted RLC data PDU awaiting for acknowledgements) or if no new RLC data PDU can be transmitted (e.g., due to window stalling), consider the AMD PDU with a sequence number (SN)=VT(S)−1 for retransmission or consider any AMD PDU which has not been positively acknowledged for retransmission. The entity shall then include a poll in a RLC data PDU.

As discussed in 3GPP TS 36.322 section 5.2.3 entitled "Status reporting", an AM RLC entity sends STATUS PDUs to its peer AM RLC entity in order to provide positive and/or negative acknowledgements of RLC PDUs (or portions of them). Radio resource control (RRC) configures whether or not the status prohibit function is to be used for an AM RLC entity. Triggers to initiate STATUS reporting include polling from its peer AM RLC entity such that when a RLC data PDU with SN=x and the poll (P) field set to "1" is received from lower layer, the receiving side of an AM RLC entity shall: if the PDU is to be discarded or if x<VR(MS) or x>=VR(MR), trigger a STATUS report; else delay triggering the STATUS report until x<VR(MS) or x>=VR(MR). This ensures that the RLC Status report is transmitted after HARQ reordering.

In accordance with the above from 3GPP TS 36.322 section 5.2.2.1, one trigger for RLC to poll is when "both the transmission buffer and the retransmission buffer becomes empty . . . after the transmission of the RLC data PDU." In fact, polling is the exclusive mechanism to confirm successful reception of the last upper-layer data to be sent. According to 3GPP TS 36.322 section 5.2.2.3, if the transmission buffers remain empty when the poll-retransmit timer expires, a PDU is retransmitted in order to carry the repeated poll. This situation, of transmitting the last data in the RLC's transmission queue, is one scenario of interest for certain embodiments of the invention.

When an RLC data PDU is transmitted with the Poll bit set, all of the following steps may take place before receiving the polled RLC Status PDU: (1) The data PDU with the poll is successfully received only after the maximum number of medium access control (MAC)-level retransmissions (the time this takes is referred to as maximum one-way RLC delay); (2) When the data PDU is received at the peer RLC entity, the RLC reordering timer has just been started by a lower-numbered PDU. If the PDU missing below that PDU is not received, it takes another one-way RLC delay for the reordering timer to expire; (3) The PDU immediately preceding the data PDU with the poll has been lost at MAC, with the result that after the reordering timer expires in step 2, it is restarted. It takes another one-way RLC delay for the timer to expire again; and (4) Only after the expiry in step 3 will the polled Status report be triggered (this is because of the above specification text "delay triggering the STATUS report until x<VR(MS) or x>=VR(MR)"). It can take another one-way RLC delay for the polled RLC Status PDU to reach the peer entity that sent the poll.

In a scenario where the polling RLC has transmitted the last data in queue, if that RLC entity repeats the poll before waiting for the duration of the above steps (after which the response to the first poll can eventually be received), it can result in duplicated non-acknowledgements (NACKs) of the lost PDUs being sent, which in turn results in their duplicated retransmissions. This is particularly harmful when the radio conditions have turned from good to worse, in which case the AMD PDUs retransmitted can be large, and those retransmissions that are duplicated result in wasteful use of radio resources.

Thus, the duration of the poll-retransmit timer should span 4 times the maximum one-way RLC delay. Indeed, its value range in the RRC specification spans all the way to 500 ms, while that of the reordering timer spans to 200 ms, as specified in the LTE RRC specification, 3GPP TS 36.331.

The many possible steps listed above, which the poll-retransmit timer needs to cover, mean that a data-transmitting RLC entity will be slow to react to an unanswered poll. In particular, when the AMD PDU carrying the last data to be sent is lost at MAC layer, it will take a long time to recover the lost data. This problem also applies to the transmission of small but important upper-layer data with direct impacts to quality of experience (QoE), such as an internet protocol (IP) multimedia subsystem (IMS)-signaling message, an RRC message like a measurement report, a hypertext transfer protocol (HTTP) request, transmission control protocol (TCP) ACK, etc.

In the following, in one embodiment, consider X to be the sequence number (SN) of the data PDU in which a poll is transmitted, and N to be the lowest SN for which no acknowledgement—positive or negative—has been received yet. The lowest SN here meaning the SN that minimizes $(SN-VT(A))$ modulo $2^{[sn-FieldLength]}$, in line with the RLC conventions.

According to an embodiment, the following conditions are applied to steps 1-4 discussed above: for both steps 2 and 3 to take place, requires that $X-N \geq 3$ (again with VT(A) as modulus base); and for either of steps 2 and 3 to be possible, requires that $X-N \geq 1$.

Accordingly, one embodiment provides that the duration of the poll-retransmit timer depends on whether at least one of the above conditions hold.

In another embodiment, N may be replaced with VT(A), i.e., the oldest PDU still waiting to be positively acknowledged. Although, N can be obtained directly as the value of the ACK_SN field in received RLC Status PDUs.

While one scenario of interest is when the RLC's transmission buffers become empty (because that is where the drawbacks of too hasty poll repetition are most severe), certain embodiments of the invention are not restricted to that scenario only.

The transmitting side of each AM RLC entity may maintain the following state variables: an acknowledgement state variable—VT(A), a maximum send state variable—VT(MS), a send state variable—VT(S), and a poll send state variable—POLL_SN. The acknowledgement state variable, VT(A), holds the value of the SN of the next AMD PDU for which a positive acknowledgment is to be received in-sequence, and it serves as the lower edge of the transmitting window. VT(A) may be initially set to 0, and may be updated whenever the AM RLC entity receives a positive acknowledgment for an AMD PDU with SN=VT(A). The Maximum send state variable, VT(MS), equals VT(A)+AM_Window_Size, and serves as the higher edge of the transmitting window. The send state variable, VT(S), holds the value of the SN to be assigned for the next newly generated AMD PDU. VT(S) may be initially set to 0, and may be updated whenever the AM RLC entity delivers an AMD PDU with SN=VT(S). The poll send state variable, POLL_SN, holds the value of VT(S)-1 upon the most recent transmission of a RLC data PDU with the poll bit set to "1". POLL_SN may be initially set to 0.

In addition to the above-described state variables, embodiments of the invention may provide a new state variable (referred to as NEW_STATE_VARIABLE in what follows). This new state variable holds the value of the SN of the next AMD PDU for which any initial acknowledgment, positive or negative, is to be received. The new state variable may be initially set to 0.

In an embodiment, the alternative durations of the timer may be configured by RRC. Alternatively, different fractions or multiples of the single duration that RRC currently configures may be used.

Assuming the latter of the above alternatives, one possible implementation may be as follows. To include a poll in a RLC data PDU, the transmitting side of an AM RLC entity sets the P field of the RLC data PDU to "1", sets PDU_WITHOUT_POLL to 0, and sets BYTE_WITHOUT_POLL to 0. According to an embodiment, if, for the SN field in the PDU, SN−NEW_STATE_VARIABLE≥3, then the next duration of t-PollRetransmit is set to the time configured by RRC; else, if SN−NEW_STATE_VARIABLE≥1, then the next duration of t-PollRetransmit is set to the time configured by RRC, multiplied by ¾; else, the next duration of t-PollRetransmit is set to the time configured by RRC, divided by 2.

When receiving a STATUS PDU from its peer AM RLC entity, the transmitting side of the AM RLC entity may: if, for the ACK_SN field in the STATUS PDU, ACK_SN>NEW_STATE_VARIABLE, then set NEW_STATE_VARIABLE equal to ACK_SN.

Figure 2:
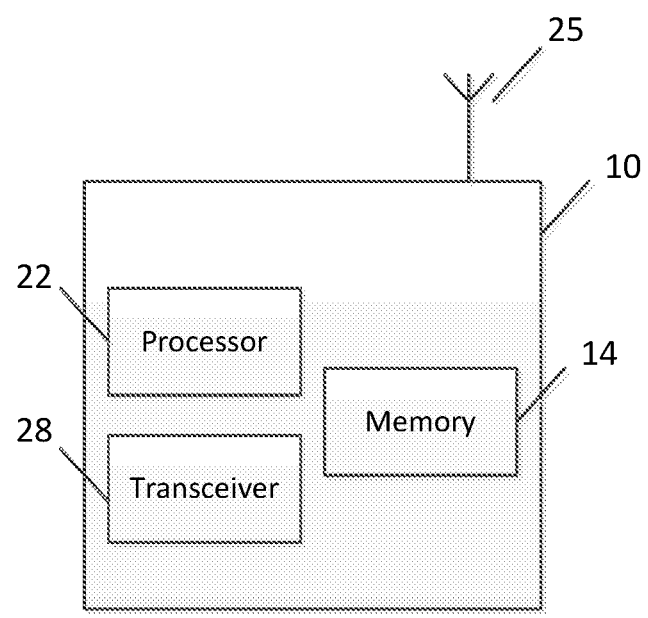
FIG. 2 illustrates an example of an apparatus, according to an embodiment of the invention.

FIG. 2 illustrates an example of an apparatus 10 according to an embodiment. In an embodiment, apparatus 10 may be a node, entity, host, or server in a communications network or serving such a network. For example, in certain embodiments, apparatus 10 may be a network access node or network entity for a radio access network, such as LTE or LTE-A. Thus, in certain embodiments, apparatus 10 may be a base station or eNB. In other embodiments, apparatus 10 may be a mobile station, mobile device, or UE, for example. In particular, in an embodiment, apparatus 10 may represent a protocol entity, such as an AM RLC entity. The protocol entity may be included in an eNB or UE, such as AM RLC entity 105 illustrated in FIG. 1. However, in other embodiments, apparatus 10 may be other components within a radio access network. It should be noted that one of ordinary skill in the art would understand that apparatus 10 may include components or features not shown in FIG. 2.

As illustrated in FIG. 2, apparatus 10 includes a processor 22 for processing information and executing instructions or operations. Processor 22 may be any type of general or specific purpose processor. While a single processor 22 is shown in FIG. 2, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or network entity, such as an eNB or a UE, or may be a protocol entity (e.g., an AM RLC entity) included in an eNB or UE, for example. According to certain embodiments, apparatus 10 may be controlled by memory 14 and processor 22 to transmit a poll to a peer protocol entity, such as an AM RLC entity, to trigger status reporting at the peer protocol entity. In an embodiment, apparatus 10 may be controlled by memory 14 and processor 22 to start a timer (e.g., a poll re-transmit timer) and set a duration for the timer based on whether at least one predefined condition is met. In other words, the timer may be started with the duration of timer being based on whether the at least one predefined condition is met. The at least one predefined condition may depend at least on a value of a sequence number (SN) of a protocol data unit (PDU) in which the poll is transmitted. In certain embodiments, the duration of the timer may be set or determined prior to starting the timer. In other embodiments, the duration of the timer may be set or determined simultaneously with the start of the timer.

According to one embodiment, apparatus 10 may then be controlled by memory 14 and processor 22 to re-transmit a poll when the timer expires. In one embodiment, the timer is a poll re-transmit timer.

In an embodiment, the duration (of the timer) may depend on whether at least one of the following conditions is met: $X-N \geq 3$, or $X-N \geq 1$, where X is the sequence number (SN) of a data protocol data unit (PDU) in which the poll is transmitted, and N is a lowest sequence number (SN) for which no acknowledgement and no non-acknowledgement has been received. Alternatively, in another embodiment, N may be equal to VT(A) (the acknowledgement state variable). As one example, if the first condition of $X-N \geq 3$ holds, then the duration may be set to 100 ms; while if the second condition of $X-N \geq 1$ holds, then the duration may be set to 75 ms, for instance. This is just one example possibility for the duration and other possibilities may be feasible according to other embodiments.

According to some embodiments, after transmitting the poll, transmission buffers of the apparatus 10 may become empty.

In one embodiment, when, for the sequence number (SN) of a data protocol data unit (PDU) in which the poll is transmitted, SN−NEW_STATE_VARIABLE≥3, apparatus 10 may be controlled by memory 14 and processor 22 to set a next duration of the poll re-transmit timer to a time configured by radio resource control (RRC). When SN−NEW_STATE_VARIABLE≥1, apparatus 10 may be controlled by memory 14 and processor 22 to set a next duration of the poll re-transmit timer to a time configured by radio resource control (RRC) multiplied by ¾. When SN−NEW_STATE_VARIABLE is not greater than or equal to 1, apparatus 10 may be controlled by memory 14 and processor 22 to set a next duration of the poll re-transmit timer to a time configured by radio resource control (RRC) divided by 2. According to an embodiment, the NEW_STATE_VARIABLE is a variable storing a value of the sequence number (SN) of a next acknowledged mode data (AMD) protocol data unit (PDU) for which any initial acknowledgement (positive or negative) is to be received.

In certain embodiments, apparatus 10 may be controlled by memory 14 and processor 22 to receive an acknowledgement (ACK) or non-acknowledgement (NACK) from the peer protocol entity (e.g., an AM RLC entity).

Figure 3:
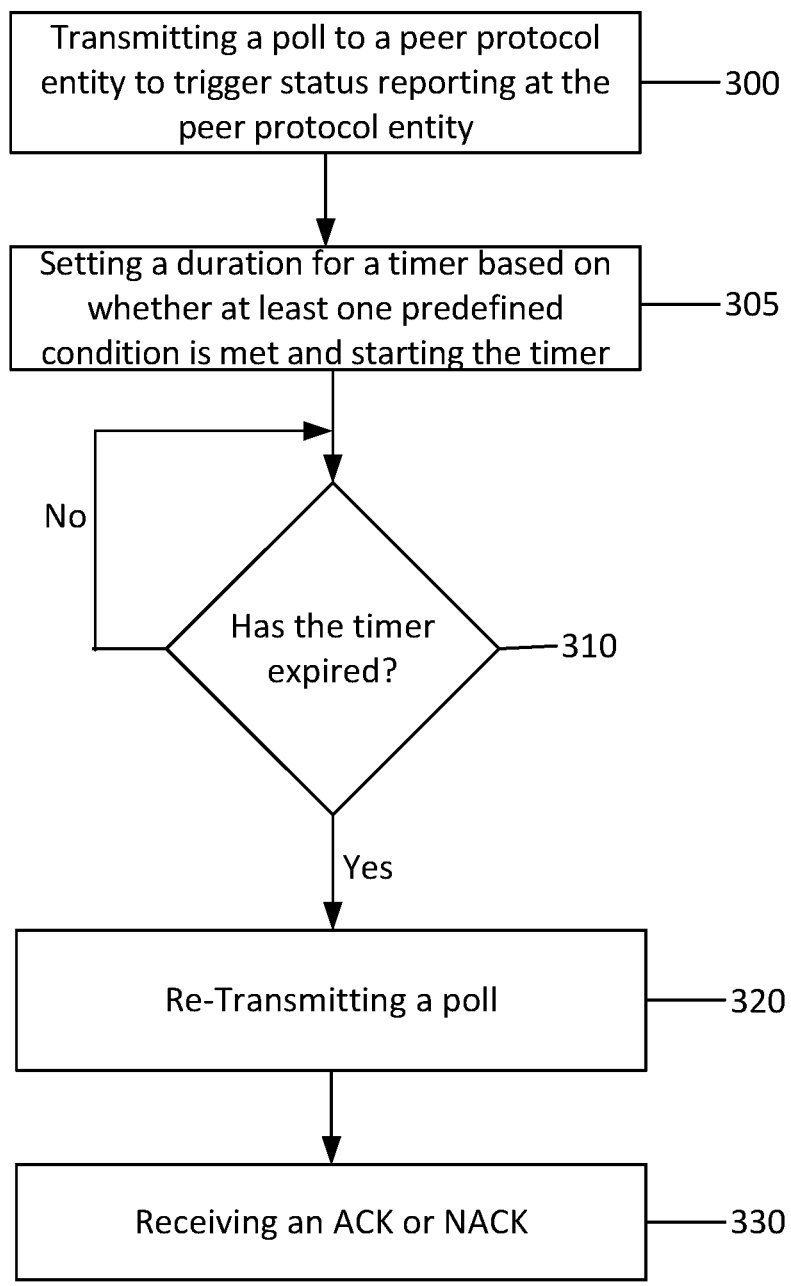
FIG. 3 illustrates an example flow chart of a method, according to an embodiment of the invention.

FIG. 3 illustrates an example flow diagram of a method, according to one embodiment. The method of FIG. 3 may be performed by a network node or network entity, such as an eNB, UE, or protocol entity (e.g., AM RLC entity) included in an eNB or UE, for example. The method may include, at 300, transmitting a poll to a peer protocol entity to trigger status reporting at the peer protocol entity. According to one embodiment, the peer protocol entity may be an AM RLC entity.

In an embodiment, the method may then include, at 305, setting a duration for a timer based on whether at least one predefined condition is met, and starting the timer. According to one embodiment, the timer may be a poll re-transmit timer. The at least one predefined condition may depend at least on a value of a sequence number (SN) of a protocol data unit (PDU) in which the poll is transmitted. In certain embodiments, the setting of the duration of the timer may be performed prior to starting the timer. In other embodiments, the duration of the timer may be set or determined simultaneously with the start of the timer.

According to one embodiment, the method may further include, at 310, determining whether the timer has expired. If the timer has expired, then the method may include, at 320, re-transmitting a poll when the poll re-transmit timer expires. If the poll re-transmit timer has not expired, then the method may continue to check whether the poll re-transmit timer has expired.

In an embodiment, the duration (of the timer) may depend on whether at least one of the following conditions is met: X−N≥3, or X−N≥1, where X is the sequence number (SN) of a data protocol data unit (PDU) in which the poll is transmitted, and N is a lowest sequence number (SN) for which neither acknowledgement or non-acknowledgement has been received. Alternatively, in another embodiment, N may be equal to VT(A) (the acknowledgement state variable). According to some embodiments, after transmitting the poll, transmission buffers of the AM RLC entity may become empty.

In one embodiment, when, for the sequence number (SN) of a data protocol data unit (PDU) in which the poll is transmitted, SN−NEW_STATE_VARIABLE≥3, the setting of the duration may further include setting a next duration of the poll re-transmit timer to a time configured by radio resource control (RRC). When SN−NEW_STATE_VARIABLE≥1, the setting of the duration may further include setting a next duration of the poll re-transmit timer to a time configured by radio resource control (RRC) multiplied by ¾. When SN−NEW_STATE_VARIABLE is not greater than or equal to 1, the setting of the duration may further include setting a next duration of the poll re-transmit timer to a time configured by radio resource control (RRC) divided by 2. According to an embodiment, the NEW_STATE_VARIABLE is a variable storing a value of the sequence number (SN) of a next acknowledged mode data (AMD) protocol data unit (PDU) for which any initial acknowledgement (positive or negative) is to be received.

In certain embodiments, the method may also include, at 330, receiving an acknowledgement (ACK) or non-acknowledgement (NACK) from the peer protocol entity.

In view of the above, embodiments of the invention provide several technical improvements and/or advantages. For example, some of the technical improvements and/or advantages include optimizing the poll-retransmit timer of the RLC protocol, thereby allowing LTE-latency reduction without sacrificing efficient use of radio resources.

In some embodiments, the functionality of any of the methods, processes, or flow charts described herein may be implemented by software and/or computer program code or portions of it stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
transmitting, by a protocol entity, a poll to a peer protocol entity to trigger status reporting at the peer protocol entity;
starting a timer with a duration based on whether at least one predefined condition is met, wherein the at least one predefined condition depends at least on a difference between a value of a sequence number (SN) of a protocol data unit (PDU) in which the poll is transmitted and a value of a lowest sequence number (SN) for which neither acknowledgement or non-acknowledgement has been received; and
re-transmitting a poll when the timer expires.

2. The method according to claim 1, further comprising receiving an acknowledgement (ACK) or non-acknowledgement (NACK) from the peer protocol entity.

3. The method according to claim 1, wherein the duration depends on whether at least one of the following conditions is met:

$X-N \geq 3$, or $X-N \geq 1$, wherein X is the sequence number (SN) of the data protocol data unit (PDU) in which the poll is transmitted, and wherein N is the lowest sequence number (SN) for which neither acknowledgement or non-acknowledgement has been received, or N equals an acknowledgement state variable VT(A).

4. The method according to claim 1, wherein, after transmitting the poll, the protocol entity's transmission buffers become empty.

5. The method according to claim 1, wherein, when, for the sequence number (SN) of a data protocol data unit (PDU) in which the poll is transmitted, SN−NEW_STATE_VARIABLE≥3, the method further comprising setting a next duration of the poll re-transmit timer to a time configured by radio resource control (RRC), wherein NEW_STATE_VARIABLE is a variable storing a value of the sequence number (SN) of a next acknowledged mode data (AMD) protocol data unit (PDU) for which any initial positive or negative acknowledgement is to be received.

6. The method according to claim 5, wherein, when SN−NEW_STATE_VARIABLE≥1, the method further comprising setting a next duration of the timer to a time configured by radio resource control (RRC) multiplied by ¾.

7. The method according to claim 6, wherein, when SN−NEW_STATE_VARIABLE is not greater than or equal to 1, the method further comprising setting a next duration of the timer to a time configured by radio resource control (RRC) divided by 2.

8. The method according to claim 1, wherein the protocol entity comprises an acknowledged mode (AM) radio link control (RLC) entity, and wherein the timer comprises a poll re-transmit timer.

9. An apparatus, comprising:
at least one processor; and
at least one memory including computer program code,
    wherein the at least one memory and computer program code are configured, with the at least one processor, to cause the apparatus at least to
transmit a poll to a peer protocol entity to trigger status reporting at the peer protocol entity;
start a timer with a duration based on whether at least one predefined condition is met, wherein the at least one predefined condition depends at least on a difference between a value of a sequence number (SN) of a protocol data unit (PDU) in which the poll is transmitted and a value of a lowest sequence number (SN) for which neither acknowledgement or non-acknowledgement has been received; and
re-transmit a poll when the timer expires.

10. The apparatus according to claim 9, wherein the at least one memory and computer program code are further configured, with the at least one processor, to cause the apparatus at least to receive an acknowledgement (ACK) or non-acknowledgement (NACK) from the peer protocol entity.

11. The apparatus according to claim 9, wherein the duration depends on whether at least one of the following conditions is met:

$X-N \geq 3$, or $X-N \geq 1$, wherein X is the sequence number (SN) of the data protocol data unit (PDU) in which the poll is transmitted, and wherein N is the lowest sequence number (SN) for which neither acknowledgement or non-acknowledgement has been received, or N equals an acknowledgement state variable VT(A).

12. The apparatus according to claim 9, wherein, after transmitting the poll, transmission buffers of the apparatus become empty.

13. The apparatus according to claim 9, wherein, when, for the sequence number (SN) of a data protocol data unit (PDU) in which the poll is transmitted, SN−NEW_STATE_VARIABLE≥3, the at least one memory and computer program code are further configured, with the at least one processor, to cause the apparatus at least to set a next duration of the poll re-transmit timer to a time configured by radio resource control (RRC), wherein NEW_STATE_VARIABLE is a variable storing a value of the sequence number (SN) of a next acknowledged mode data (AMD) protocol data unit (PDU) for which any initial positive or negative acknowledgement is to be received.

14. The apparatus according to claim 13, wherein, when SN−NEW_STATE_VARIABLE≥1, the at least one memory and computer program code are further configured, with the at least one processor, to cause the apparatus at least to set a next duration of the timer to a time configured by radio resource control (RRC) multiplied by ¾.

15. The apparatus according to claim 14, wherein, when SN−NEW_STATE_VARIABLE is not greater than or equal to 1, the at least one memory and computer program code are further configured, with the at least one processor, to cause the apparatus at least to set a next duration of the timer to a time configured by radio resource control (RRC) divided by 2.

16. The apparatus according to claim 8, wherein the apparatus comprises an acknowledged mode (AM) radio link control (RLC) entity, and wherein the timer comprises a poll re-transmit timer.

17. A computer program, embodied on a non-transitory computer readable medium, the computer program configured to control a processor to perform a process, comprising:
transmitting a poll to a peer protocol entity to trigger status reporting at the peer protocol entity;
starting a timer with a duration that is based on whether at least one predefined condition is met, wherein the at least one predefined condition depends at least on a difference between a value of a sequence number (SN) of a protocol data unit (PDN) in which the poll is transmitted and a value of a lowest sequence number (SN) for which neither acknowledgement or non-acknowledgement has been received; and
re-transmitting a poll when the timer expires.

\* \* \* \* \*